US008351895B2

(12) United States Patent
Penix et al.

(10) Patent No.: US 8,351,895 B2
(45) Date of Patent: Jan. 8, 2013

(54) WIRELESS SECURITY DEVICE AND METHOD TO PLACE EMERGENCY CALLS

(75) Inventors: Henry A. Penix, Tulsa, OK (US); Laurie L. Penix, Tulsa, OK (US); Zachry A. Penix, Tulsa, OK (US); Peter E. H. Hauser, Kirkland, WA (US)

(73) Assignee: Zomm, LLC, Tulsa, OK (US)

( * ) Notice: Subject to any disclaimer, the term of this patent is extended or adjusted under 35 U.S.C. 154(b) by 312 days.

(21) Appl. No.: 12/554,517

(22) Filed: Sep. 4, 2009

(65) Prior Publication Data

US 2011/0059720 A1    Mar. 10, 2011

(51) Int. Cl.
*H04M 11/04* (2006.01)
*H04M 3/42* (2006.01)
*H04W 24/00* (2009.01)
*H04B 7/00* (2006.01)

(52) U.S. Cl. ............... 455/404.1; 455/41.2; 455/41.3; 455/404.2; 455/414.1; 455/456.1; 455/456.2; 455/456.6; 455/457

(58) Field of Classification Search ............ 455/404.1, 455/404.2, 456.1–456.6
See application file for complete search history.

(56) References Cited

U.S. PATENT DOCUMENTS

| | | | |
|---|---|---|---|
| 5,635,897 A | 6/1997 | Kuo | |
| 5,796,338 A | 8/1998 | Mardirossian | |
| 6,265,974 B1 | 7/2001 | D'Angelo et al. | |
| 6,462,660 B1 | 10/2002 | Cannon et al. | |
| 6,472,986 B1 | 10/2002 | Sorriaux | |
| 6,836,212 B2 | 12/2004 | Sawinski | |
| 6,885,848 B2 | 4/2005 | Lee | |
| 6,956,480 B2 | 10/2005 | Jespersen | |
| 7,009,512 B2 | 3/2006 | Cordoba | |
| 7,038,590 B2 * | 5/2006 | Hoffman et al. | 340/573.1 |
| 7,054,594 B2 | 5/2006 | Bloch et al. | |
| 7,075,433 B2 | 7/2006 | Singer | |
| 7,248,840 B2 | 7/2007 | Chien | |
| 7,251,470 B2 | 7/2007 | Faucher et al. | |

(Continued)

FOREIGN PATENT DOCUMENTS

BR        PI0501159 A      9/2006

(Continued)

OTHER PUBLICATIONS

English Translation of DE 20 2007 009 831.6; published Jul. 2007.*

(Continued)

*Primary Examiner* — Dwayne Bost
*Assistant Examiner* — Nalini Yerneni
(74) *Attorney, Agent, or Firm* — Holland & Knight LLP; Brian J. Colandreo, Esq.; Michael T. Abramson, Esq.

(57) ABSTRACT

A wireless security device and method includes implementing, by a wireless security device, one or more Bluetooth™ wireless protocol profiles for connecting to one or more Bluetooth™ enabled devices. A Bluetooth™ enabled telephony device may be paired with the wireless security device using one or more Bluetooth™ wireless protocol profiles. The wireless security device may send a command to the telephony device over the wirelessly paired Bluetooth™ connection The command may cause the telephony device to place a telephone call to an emergency telephone number. Once the telephone call is placed, a prerecorded emergency message may be sent from the wireless security device to the telephony device, causing the telephony device to play the prerecorded emergency message.

28 Claims, 7 Drawing Sheets

U.S. PATENT DOCUMENTS

| | | |
|---|---|---|
| 7,257,374 B1 | 8/2007 | Creigh |
| 7,259,671 B2 | 8/2007 | Ganley et al. |
| 7,289,025 B2 | 10/2007 | Perez-Garcia et al. |
| 7,333,776 B1 | 2/2008 | York |
| 7,336,173 B1 | 2/2008 | Sandbrand |
| 7,336,929 B2 | 2/2008 | Yasuda et al. |
| 7,518,514 B2 | 4/2009 | Bauchot et al. |
| 7,535,357 B2 | 5/2009 | Enitran et al. |
| 2003/0008659 A1* | 1/2003 | Waters et al. ............... 455/456 |
| 2003/0083044 A1 | 5/2003 | Schreyer et al. |
| 2004/0127241 A1* | 7/2004 | Shostak ...................... 455/500 |
| 2004/0185915 A1* | 9/2004 | Ihara et al. ................ 455/569.1 |
| 2004/0203570 A1* | 10/2004 | Berger ...................... 455/404.1 |
| 2005/0143152 A1 | 6/2005 | Yueh |
| 2005/0176402 A1* | 8/2005 | Verloop et al. ............ 455/404.1 |
| 2007/0042714 A1 | 2/2007 | Ayed |
| 2007/0082652 A1 | 4/2007 | Hartigan et al. |
| 2007/0109120 A1 | 5/2007 | Schaefer |
| 2008/0182554 A1 | 7/2008 | Fan |
| 2008/0214111 A1 | 9/2008 | Moshir et al. |
| 2008/0214142 A1* | 9/2008 | Morin et al. ............... 455/404.2 |
| 2009/0058670 A1 | 3/2009 | Sweeney et al. |
| 2009/0061769 A1 | 3/2009 | Zimbric et al. |
| 2010/0056055 A1* | 3/2010 | Ketari ........................ 455/41.3 |

FOREIGN PATENT DOCUMENTS

| | | | |
|---|---|---|---|
| DE | 20 2007 009 831.6 | * | 12/2007 |
| DE | 202007009831 U1 | | 12/2007 |
| EP | 1251472 A1 | * | 10/2002 |
| EP | 1924069 A1 | * | 5/2008 |
| FR | 2 769 738 | | 4/1999 |
| GB | 2440630 A | | 2/2008 |
| WO | 2006076785 A1 | | 7/2006 |

OTHER PUBLICATIONS

English Translation of DE 20 2007 009 831.6; published Jul. 2007 (already provided in previous office action).*
International Search Reported of PCT/US2010/044077 dated Oct. 28, 2010, pp. 3.
Deal Extreme, Bluetooth 2.0 External GPS Receiver (GBM100), http://www.dealextreme.com/details.dx/sku.12350, (Accessed Jul. 16, 2009), 3 pages.
Cleo Bluetooth Phone Guard, FAQ, User Manual, 5 pages.
Tenbu Technologies, nio—The First Line of Defense, Learn More, http://www.bluenio.com/learnmore.htm, (Accessed on Jul. 15, 2009), 2 pages.
Nio™—the first line of defence | Learn More, http://www.bluenio.com/learnmore.htm, "do you nio?" Jul. 15, 2009, pp. 1-2.
International Preliminary Report on Patentability received in International Patent Application No. PCT/US2010/044077, mailed Mar. 15, 2012, (7 pgs.).
"Macaron & Versatis max+", Thomson Telecom 2005.

* cited by examiner

WIRELESS SECURITY DEVICE AND METHOD TO PLACE EMERGENCY CALLS

TECHNICAL FIELD

This disclosure relates to security and, more particularly, to wireless security devices and methods.

BACKGROUND

Bluetooth™ is a wireless protocol for connecting and exchanging data between electronic devices over short distances. Bluetooth™ wireless technology is used in many ways today. Most countries now require the use of handsfree systems while driving a motorized vehicle in order to avoid driver distractions on the roads. As a result, almost every phone produced today supports the Bluetooth™ Hands-Free and Bluetooth™ Headset profile.

Many people use their mobile phones as more than simply a mobile telephony device. Smart Phones are now becoming extremely prevalent and are the largest growing mobile phone market. These phones are often expensive to replace, and worse yet, they hold information that is important to the owner of the mobile phone such as contacts, calendars, applications, photos, and sometimes even critical personal or business data.

Similarly, media players have become ubiquitous with many media players now supporting Bluetooth™ wireless stereo streaming through the A2DP profile. A device that protects a mobile phone or media players from theft or loss using the Bluetooth™ wireless technology may be useful to help protect this valuable data or media. A device that places emergency telephone calls through a Bluetooth™ mobile phone is also needed. A device that includes additional security features may protect a user even further.

BRIEF SUMMARY OF THE DISCLOSURE

In an embodiment, a wireless security device may include processor, a wireless transceiver, a memory; and computer program instructions stored in the memory, which, when executed by the processor, cause the wireless security device to perform operations. The operations may include implementing one or more Bluetooth™ wireless protocol profiles for connecting to one or more Bluetooth™ enabled devices; wirelessly pairing, via the wireless transceiver, with a Bluetooth™ enabled telephony device using at least one of the one or more Bluetooth™ wireless protocol profiles, thus creating a wirelessly paired Bluetooth™ connection between the wireless security device and the telephony device; sending a command, over the wirelessly paired Bluetooth™ connection, to the telephony device to place a telephone call to an emergency telephone number; and sending a prerecorded emergency message to the telephony device over the wirelessly paired Bluetooth™ connection, causing the telephony device to play the prerecorded emergency message.

One or more of the following features may be included. The Bluetooth™ wireless protocol profiles may be a Bluetooth™ hands-free profile, a Bluetooth™ headset profile, and/or a Bluetooth™ advanced audio distribution profile.

The operations may include receiving, over the wirelessly paired Bluetooth™ connection, a location of the Bluetooth™ enabled telephony device, and identifying the emergency telephone number based on the location. Receiving the location of the Bluetooth™ enabled telephony device may include sending a command to: a telephone number of the telephony device, a telephone network providing service to the telephony device, and/or a global positioning system (GPS) location of the telephony device. A response from the telephony device may include a telephone number of the telephony device, a telephone network providing service to the telephony device, and/or a GPS location of the telephony device. The operations may also include determining a current location of the telephony device based on one or more of the telephone number, the telephone network, and the GPS location.

Identifying the emergency telephone number may include accessing a lookup table stored in the memory. The lookup table may include location codes and emergency telephone numbers associated with the location codes. The location of the one or more emergency telephone numbers may be correlated with at least one of the one or more location codes to obtain the location.

The wireless security device may also include a speaker and a microphone. The operations may further include providing speakerphone services such as sending audio data captured by the microphone to the telephony device via the wireless transceiver, and audibly playing, by the speaker, audio data received from the telephony device via the wireless transceiver. The wireless security device may also generate a panic alarm by generating an audible sound through the speaker.

The wireless security device may also include a light emitting diode and a vibration motor. The wireless security device may generate a notification when an incoming telephone call is received by the telephony device. The wireless security device may generate an out-of-range notification when a measurement of a quality parameter of the Bluetooth™ wireless connection indicates the quality parameter of the Bluetooth™ wireless connection is outside a predetermined quality threshold. The out-of-range notification may include generating a unique out-of-range notification for each Bluetooth™ enabled device if more than one Bluetooth™ enabled devices are paired with the wireless security device. The wireless security device generate a notification when at least one of the one or more Bluetooth™ wireless protocol profiles is disconnected by a paired Bluetooth™ device. The notifications may comprise illuminating the light emitting diode, activating the vibration motor, and/or generating an audible sound through the speaker.

The wireless security device may also include a button. In response to an activation of the button, the wireless security device may cause a telephony device to answer or cancel an incoming telephone call. In response to an activation of the button, the wireless security device may also cancel a panic alarm.

The processor and/or the wireless security transceiver of the wireless security device may implement Bluetooth™ low energy technology.

In another embodiment, a method includes implementing, by a wireless security device, one or more Bluetooth™ wireless protocol profiles for connecting to one or more Bluetooth™ enabled devices. The method may wirelessly pair, via a wireless transceiver of the wireless security device, with a Bluetooth™ enabled telephony device using at least one of the one or more Bluetooth™ wireless protocol profiles, thus creating a wirelessly paired Bluetooth™ connection between the wireless security device and the telephony device. The method may cause the wireless security device to send a command over the wirelessly paired Bluetooth™ connection, to the telephony device. The command may cause the telephony device to place a telephone call to an emergency telephone number. Once the telephone call is placed, the method may send a prerecorded emergency message from the wireless security device to the telephony device over the wirelessly paired Bluetooth™ connection, causing the telephony device to play the prerecorded emergency message.

One or more of the following features may be included. The Bluetooth™ wireless protocol profiles may be a Bluetooth™ hands-free profile, a Bluetooth™ headset profile, and/or a Bluetooth™ advanced audio distribution profile. The method may receive, over the wirelessly paired Bluetooth™ connection, a location of the Bluetooth™ enabled telephony device; and may identify the emergency telephone number based on the location. Receiving the location of the Bluetooth™ enabled telephony device may include sending a command to the telephony device requesting a telephone number of the telephony device, a telephone network providing service to the telephony device, and/or a global positioning system (GPS) location of the telephony device. The method may also include receiving a response from the telephony device. The response may include a telephone number of the telephony device, a telephone network providing service to the telephony device, and/or a GPS location of the telephony device. The method may determine a current location of the telephony device based the telephone number, the telephone network, and/or the GPS location.

Identifying the emergency telephone number may include accessing a lookup table stored in the memory. The lookup table may include location codes, and emergency telephone numbers associated with the one or more location codes. Identifying the emergency telephone number may also include correlating the location with at least one of the location codes to obtain at least one of the one or more emergency telephone numbers.

The method may also send audio data captured by a microphone of the wireless security device to the telephony device via the wireless transceiver, and/or audibly play, by a speaker of the wireless security device, audio data received from the telephony device via the wireless transceiver.

The method may cause the wireless security device generate a notification when an incoming telephone call is received by the telephony device. The method may also cause the wireless security device to generate an out-of-range notification when a measurement of a quality parameter of the Bluetooth™ wireless connection indicates the quality parameter of the Bluetooth™ wireless connection is outside a predetermined quality threshold. If more than one Bluetooth™ enabled devices are paired with the wireless security device, the out-of-range notification may include a unique out-of-range notification for each Bluetooth™ enabled device. The method may also generate a notification when a Bluetooth™ wireless protocol profiles is disconnected by a paired Bluetooth™ device. The notification may include illuminating at least one light emitting diode of the wireless security device, activating a vibration motor of the wireless security device, and/or generating an audible sound through a speaker of the wireless security device.

In response to an activation of a button of the wireless security device, the method may cause the telephony device to answer or cancel an incoming call received by the telephony device. In response to an activation of a button of the wireless security device, the method may also cause the telephony device to cancel a panic alarm.

BRIEF DESCRIPTION OF THE DRAWINGS

Like references in the drawings denote like elements.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present disclosure may be written in an object oriented programming language such as Java™, Smalltalk™, C++ or the like. However, the computer program code for carrying out operations of the present disclosure may also be written in conventional procedural programming languages, such as the "C" programming language or similar programming languages. The program code may execute entirely on a computing device, such as the wireless security device described below, partly on a computing device, as a stand-alone software package, partly on a remote computer or computing device, or entirely on a remote computer or server. In the latter scenario, the remote computing device may be connected to the user's computer through a local area network (LAN), a wide area network (WAN), or a personal area network (PAN) (e.g. a Bluetooth™ network), for example.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a wireless device, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Also, it is understood that in practice, embodiments of the disclosure may implement, execute, or run the elements and/or blocks of the flowchart illustrations in any appropriate order, even though the flowchart illustrations may depict a particular embodiment with each block in a particular order.

These computer program instructions may also be stored in a computer-readable memory that can direct a processor or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computing device or other programmable data processing apparatus to cause a series of operational steps to be performed on the computing device or other programmable apparatus to produce a computer implemented process such that the instructions which execute on the computer or other programmable apparatus provide steps for implementing the functions/acts specified in the flowchart and/or block diagram block or blocks.

Figure 1:
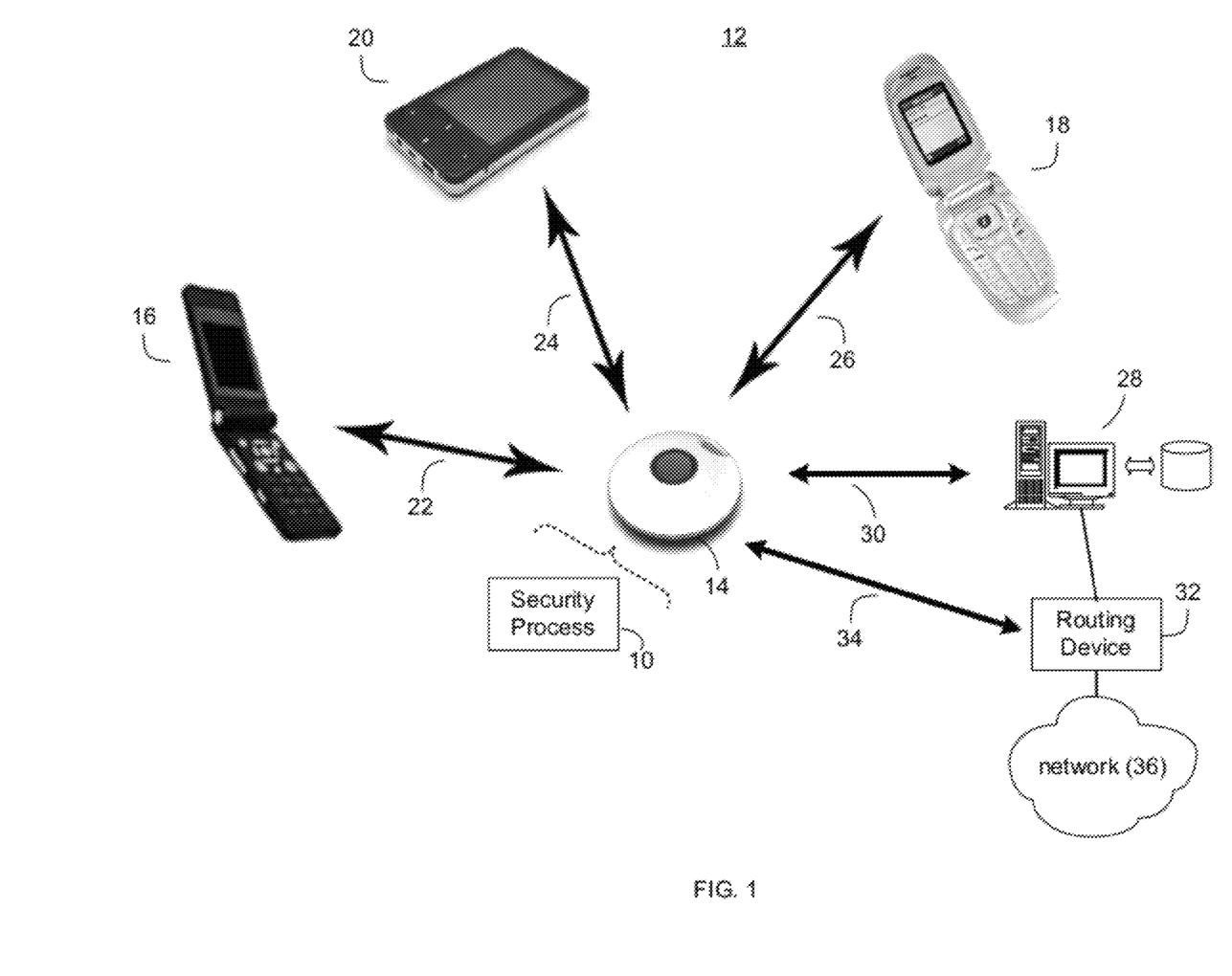
FIG. 1 is diagrammatic view of a wireless security device and network infrastructure.

FIG. 1 depicts a computing infrastructure within which security process 10 may reside. FIG. 1 shows personal area network 12. Personal area network 12 may be a wireless network used to communicate among computer devices over a relatively short range. As an example, personal area network 12 may be a Bluetooth™ network. As is known in the art, Bluetooth™ is a wireless protocol for connecting and exchanging data between electronic devices over short distances.

Various devices may be part of personal area network 12. For example, FIG. 1 shows wireless security device 14 connected to telephony device 16, 18 and media player 20, as shown by network connections 22, 24, 26. Telephony devices 16, 18 may be devices capable of placing a telephone call over a wireless or wired telephone network. For example, telephony devices 16, 18 may be cellular telephones, smart phones, modems, personal digital assistants, wired telephones, or other telephone or computing devices capable of placing a telephone call. Telephony devices 16, 18 may also be capable of performing other functions. For example, Telephony devices 16, 18 may include a processor (not shown) and a memory (not shown). Telephony devices 16, 18 may also include software instructions stored in the memory, which, when executed by the processor, cause telephony devices 16, 18 to perform operations such as executing a software application, executing an operating system, and communicating over a WAN network, for example. Telephony devices 16, 18 may also be capable of playing media files, such as audio or video files.

Media player 20 may be a device capable of playing media files, such as audio or video files. Media player 20 may also include a processor (not shown) and a memory (not shown). Media player 20 may also includes software instructions, stored in the memory, which, when executed by the processor, cause media player 20 to perform operations such as executing a software application, executing an operating system, and communicating over a WAN network, for example. Examples of media player 20 may include, but are not limited to, an iPod™ and a Zune™ media player, for example. In some cases, media player 20 may not be able to perform telephony device functions, such as placing or receiving a phone call.

Wireless security device 14 may also be connected to computer 28 via network connection 30. Computer 28 may be a general purpose computer such as a workstation or a server computer, a laptop computer, a desktop computer, a netbook computer, or any other type of computer or computing device.

Wireless security device 14 is also shown connected to routing device 32 through network connection 34. Routing device 32 may be a routing device for communication between two or more networks. As shown, routing device is also connected to network 36. Network 36 may be a wide area network, a local area network, a personal area network, a cellular network, or any other type of network. Wireless security device may communicate with network 36 via routing device 34, for example. Wireless security device 14 may also communicate with network 36 through various other communication paths. As shown in FIG. 1., wireless security device 14 may also communicate with network 36 through network connection 30 and computer 28, for example. In general, wireless security device 14 may also communication with network 36 (or other networks) through any available network communication path including but not limited to any of the telephony devices 16 and 18, or any media player 20.

The various computing devices (i.e. wireless security device 14, telephony devices 16, 18, media player 20, computer 28, and routing device 32) may be Bluetooth™ enabled devices. In other words, the various computing devices may implement and/or comply with the Bluetooth™ wireless protocol. As is known in the art, Bluetooth™ is a wireless networking protocol that allows devices to communicate over wireless connections. If the various computing devices are Bluetooth™ enabled devices, then network connections 22, 24, 26, and/or 30 may be Bluetooth™ network connections.

Figure 2:
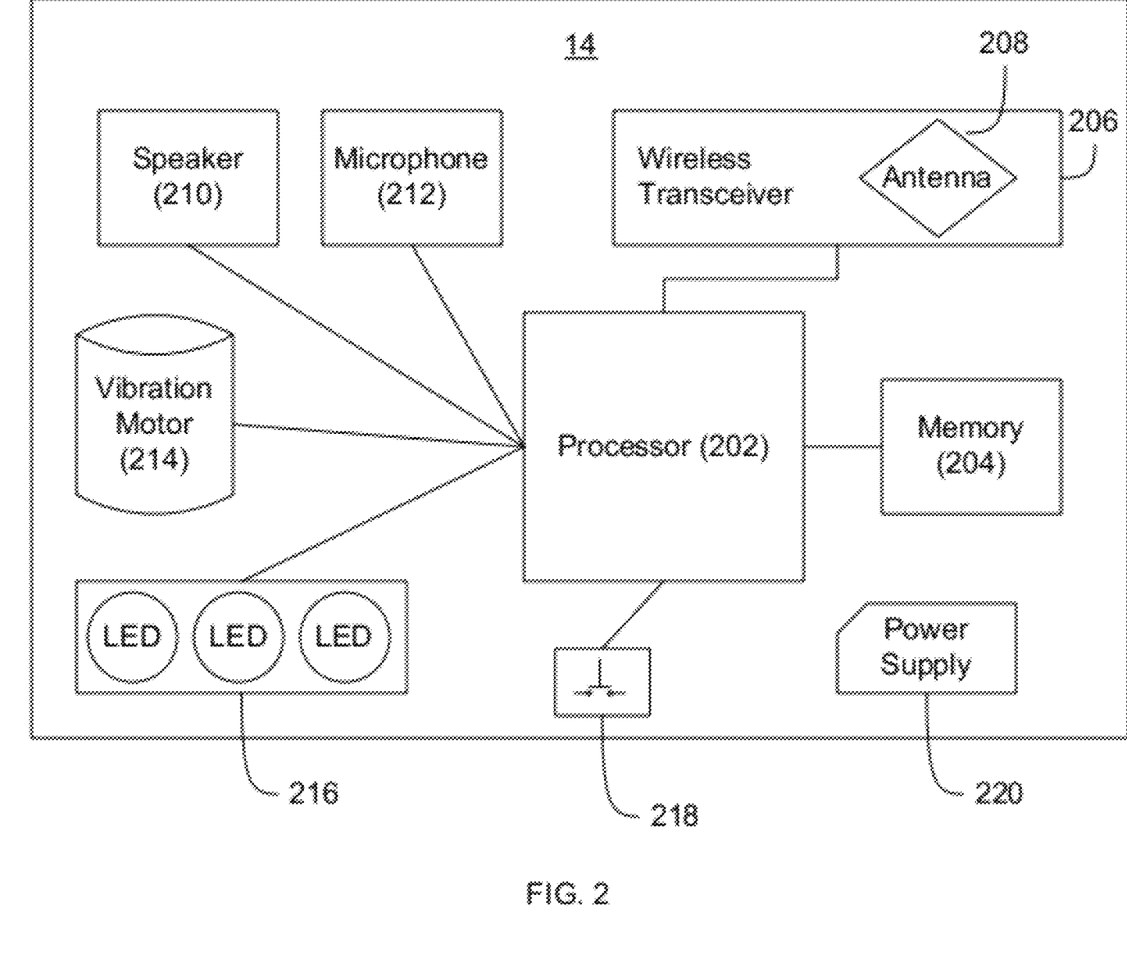
FIG. 2 is an architectural block diagram of a wireless security device.

FIG. 2 shows an architectural block diagram of wireless security device 14. As shown, wireless security device 14 may include processor 202 and memory 204. Memory 204 may be any type of computer readable storage medium, including, but not limited to, a hard drive, a CD, a DVD, a random access memory (RAM), a read only memory (ROM), a FLASH memory, or any other type of computer readable storage medium capable of storing program instructions.

In an embodiment, processor 202 may be processor specific to Bluetooth™ applications. However, processor 202 may also be a general purpose processor programmed with software instructions to perform operations specific to a Bluetooth™ application. Processor 202 may be programmed with software instructions to perform the operations of security process 10 (which will be discussed below), and/or programmed with software instructions to perform any other operations defined and/or implemented by the software instructions. Processor 202 may be a single processor, or may be a series of processors. Processor 202 may also be a chipset comprising multiple processors, computer chips, and or computer chip dies. Processor 202 may include input and output interface lines to communicate with, take input from, and/or provide output to other devices or elements. For example, processor 202 may include a memory interface/bus for communicating with memory 204, a communication interface/bus for communicating with wireless transceiver 208, an audio interface/bus for communicating with speaker 210 and/or microphone 212, and a general purpose 10 interface for communicating with and controlling vibration motor 214 and/or LED bank 216.

Wireless security device 14 may also include wireless transceiver 206 and antenna 208. Wireless transceiver 206 and antenna 208 may provide connectivity to a wireless network, such as personal area network 12, which may include sending and receiving wireless signals from the various devices that comprise personal area network 12, for example. Although shown as separate from processor 202, wireless transceiver 206 and or antenna 208 may be, in some embodiments, incorporated into processor 202. For example, wireless transceiver 206 and/or antenna 208 may be part of the same computer chip as processor 202, and/or may be part of the same chipset as processor 202.

Wireless transceiver 206 may be a Bluetooth™ wireless transceiver, for example, configured to provide connectivity via the Bluetooth™ wireless protocol. Similarly, antenna 208 may be configured or optimized to provide communication over a Bluetooth™ wireless connection. Antenna 208 may be any type of antenna, including but not limited to: a patch antenna, a wire antenna, a dipole antenna, a microwave antenna, a slotted cylinder antenna, a helical antenna, or any other type of antenna for providing wireless communication.

Wireless security device 14 may also comprise various input, output, and/or feedback elements, as shown in FIG. 2. Wireless security device 14 may include speaker 210 and/or microphone 212, for example. Speaker 210 may be an audio speaker, a piezo element, or series of speakers, which may provide audible and/or inaudible sounds. As shown in FIG. 2, speaker 210 is coupled to processor 202. Accordingly, processor 202 and/or software executed by processor 202 may control the audio sounds made by speaker 210. However, it is not necessary for speaker 210 to be directly coupled to processor 202, as shown in FIG. 2. For example, speaker 210 may be directly coupled to an audio driver circuit (not shown) that is coupled either directly or indirectly to processor 202.

Microphone 212 may be an audio microphone, or series of microphones, which may allow wireless security device to capture and/or record audible and/or inaudible sounds. As shown in FIG. 2, microphone 212 is coupled to processor 202. Accordingly, processor 202 and/or software executed by processor 202 may control microphone 212. However, it is not necessary for microphone 212 to be directly coupled to processor 202, as shown in FIG. 2. For example, microphone 212 may be directly coupled to an audio driver circuit (not shown) that is coupled either directly or indirectly to processor 202.

Wireless security device 14 may also include vibration motor 214. Vibration motor 214 may be a vibration motor which, when activated, causes wireless security device 14 to vibrate. If vibration motor 214 is activated, vibration motor 214 may cause wireless security device 14 to vibrate. The vibration may provide an alert to a user (either visually, audibly, or through tactile feedback). As shown in FIG. 2, vibration motor 214 may be coupled to processor 202. Accordingly, processor 202 and/or software executed by processor 202 may control vibration motor 214. However, it is not necessary for vibration motor 214 to be directly coupled to processor 202, as shown in FIG. 2. For example, vibration motor 214 may be directly coupled to and a motor driver circuit (not shown) that is coupled either directly or indirectly to processor 202.

Wireless security device 14 may also include a visual indicator (LED) bank 216. LED bank 216 may include one or more light emitting diodes (LEDs) or other visual indicators or lights. As shown in FIG. 2, LED bank 216 is coupled to processor 202. Accordingly, processor 202 and/or software executed by processor 202 may control any LEDs within LED bank 216. However, it is not necessary for LED bank 216 to be directly coupled to processor 202, as shown in FIG. 2. For example, LED bank 216 may be directly coupled to an display, strobe, or LED driver circuit (not shown) that is coupled either directly or indirectly to processor 202.

Wireless security device 14 may also include button 218. Button 218 may be a single button or switch, or a series of buttons and/or switches. Button 218 may be any type of button or switch that allows a user of wireless security device 14 to provide input to wireless security device 14. For example, button 218 may be a button or switch including, but not limited to: a pushbutton, a toggle button, a toggle switch, a selector switch, a momentary button, etc. A user may be able to momentarily activate button 14 (i.e. a momentary button), permanently activate button 14 (i.e. a toggle button). Momentarily activating button 14 may include activating button 14 for a short period of time (e.g. less than one second), multiple times (e.g. a double button press), or a longer period of time (e.g. more than one second).

As shown in FIG. 2, button 218 is coupled to processor 202. Accordingly, processor 202 and/or software executed by processor 202 may control and/or monitor button 218. Monitoring button 218 may include monitoring activation of button 218, and/or monitoring the duration of activation of button 218. It is not necessary for button 218 to be directly coupled to processor 202, as shown in FIG. 2. For example, button 218 may be directly coupled to a button driver circuit (not shown) that is coupled either directly or indirectly to processor 202.

Wireless security device 14 may also include power supply 220. Power supply 220 may provide power to security device 14 and/or the components and circuits of security device 14. Power supply 220 may include a disposable battery, a rechargeable battery, a solar cell, a super-capacitor, a power harvesting circuit, a recharge circuit, or any other power source for providing power to security device 14. In one implementation, processor 202, wireless transceiver 206, and or security device 14 may implement Bluetooth™ low energy technology. Accordingly, in an embodiment, power supply 220 may be configured to provide power to a Bluetooth™ low energy technology compliant device.

Figure 3:
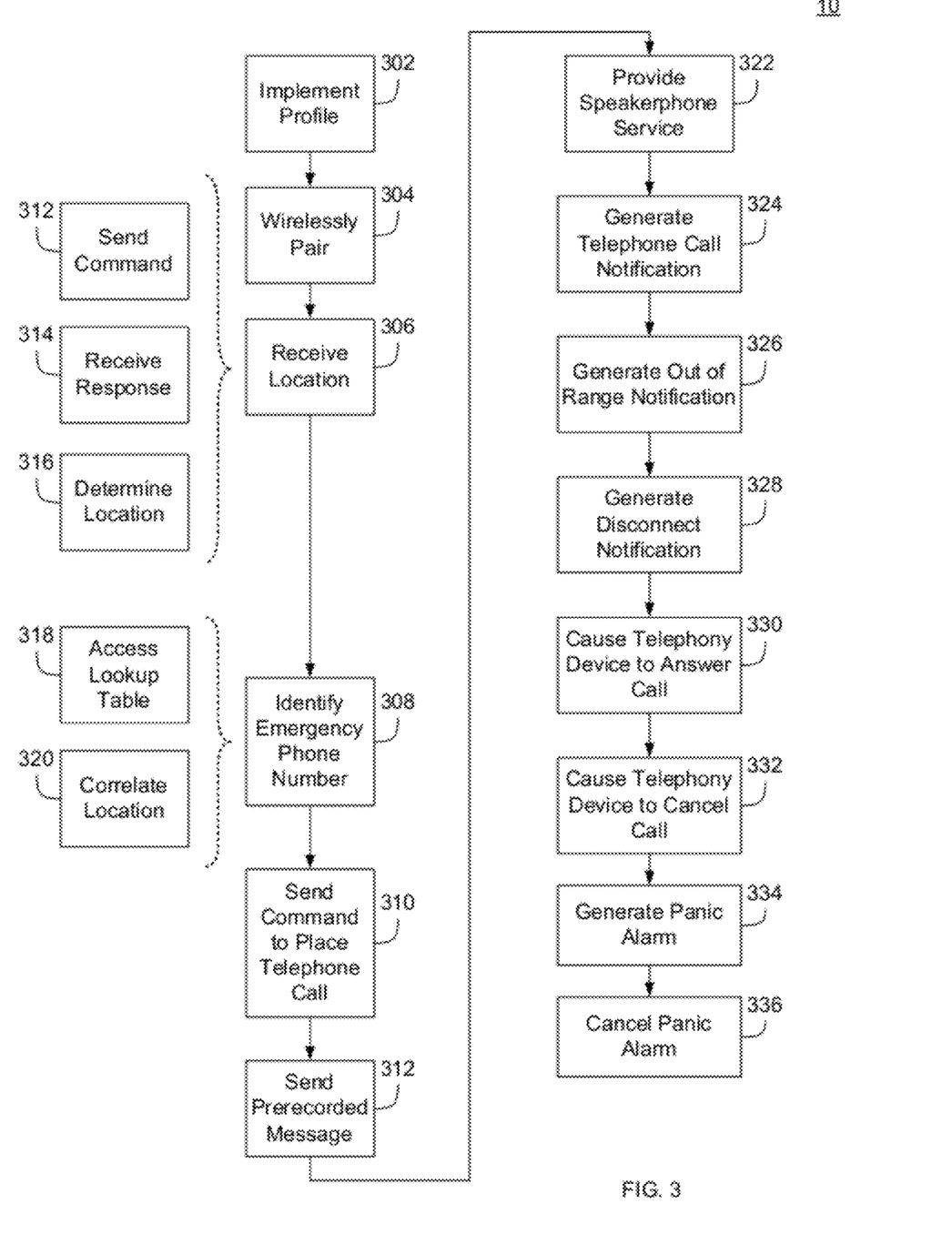
FIG. 3 is a flowchart view of a security process.

As discussed, security process 10 may reside in memory 204, and may be executed by processor 202. Turning to FIG. 3, security process 10 may implement one or more Bluetooth™ wireless protocol profiles for connecting to one or more Bluetooth™ enabled devices. A Bluetooth™ wireless protocol profile may be an interface that allows Bluetooth™ enabled devices to communicate with each other within a set of defined parameters. For example, Bluetooth™ wireless protocol profiles may include a hands-free profile, a headset profile, and/or an advanced audio distribution profile, as well as other types of Bluetooth™ wireless protocol profiles, for example.

A hands-free profile may provide services and features over a Bluetooth™ wireless connection that allow hands-free kits to communicate with mobile phones. For example, if wireless security device 14 implements a headset or hands-free profile, the headset or hands-free profile may allow security device 14 to re-route audio from a telephone call received by telephony device 16, 18 through speaker 210 and/or microphone 212. The headset or hands-free profile may also allow wireless security device 14 to send commands to telephony devices 16, 18. The commands may include AT commands, modem commands, or other commands for controlling features and functions of telephony devices 16, 18. For example, the headset or hands-free profile may also allow wireless security device 14 to cause telephony devices 16, 18 to place a call, answer a call, dial a phone number, or retrieve network-specific data, or GPS data, etc.

A headset profile may provide services or functions over a Bluetooth™ network connection that allow wireless security device 14 to act as a mobile telephone headset. For example, the headset profile may allow a user to answer a telephone call received on telephony devices 16, 18 by pressing or holding button 218, for example. The headset profile may also allow a user of wireless security device to hear audio from the telephone call through speaker 210 coupled to wireless security device 14, and/or provide audio for the telephone call through microphone 212 coupled to wireless security device 14.

An advanced audio distribution profile (A2DP) may provide services or functions over a Bluetooth™ network connection that allow wireless security device 14 to stream audio. For example, if security process 10 implements 302 an A2DP, wireless security device 14 may be able to stream audio to/from telephony device 16, 18, media player 20, and/or computer 28, for example.

Figure 4:
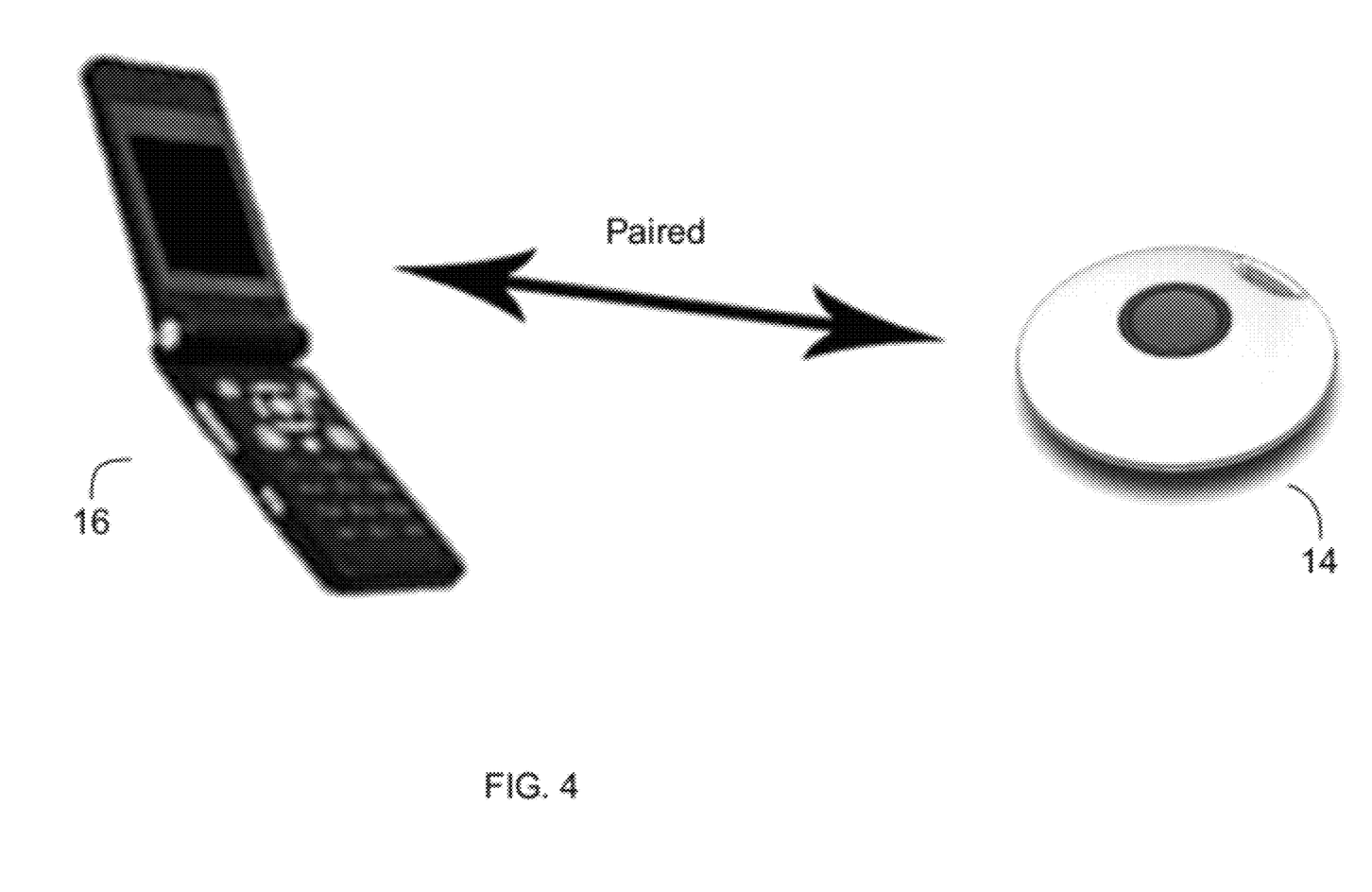
FIG. 4 is diagrammatic view of a wireless security device paired to a telephony device.

Security process 10 may wirelessly pair 304 with one or more telephony devices, such as telephony devices 16, 18. Wirelessly pairing may include establishing a wireless connection with telephony devices 16, 18, or any other Bluetooth™ enabled device. During pairing, wireless security device 14 and telephony devices 16, 18 may agree to communicate with each other and establish a connection. As is known in the art, the pairing process may include handshaking processes, authentication processes, and/or the sharing of a security passkey. Once paired, wireless security device 14 and telephony devices 16, 18 may communicate with each other and use any functions, services, or features provided by one or more Bluetooth™ protocol profiles that wireless security device 14 and telephony devices 16, 18 share. Also, once paired, wireless security device 14 and telephony devices 16, 18 may retain their paired status regardless of whether wireless security device 14 and telephony devices 16, 18 are turned off. For example, if wireless security device 14 is powered off, wireless security device 14 and telephony devices 16, 18 may retain their paired status so that, when wireless security device 14 is powered back on, wireless security device 14 and/or telephony devices 16, 18 may continue to communicate without the need to re-establish a paired connection. FIG. 4 depicts wireless security device 14 and telephony device 16 sharing a paired wireless Bluetooth™ connection.

Security process 10 may provide features that allow a user to dial an emergency phone number. For example, security process 10 may receive 306 a location of a telephony device (e.g. telephony devices 16, 18), may identify 308 a location of the telephony device, and may identify 308 an appropriate emergency phone number based on the location of the telephony device. Security process 10 may also send 310 a command to the telephony device to place a telephone call to the identified 308 emergency phone number. Once the telephone call is connected, security process 10 may send 312 a prerecorded message to the telephony device. The prerecorded message may contain data and/or audio helpful for identifying the nature of the emergency. If the prerecorded message comprises audio, the telephony device may play the prerecorded message over the connected emergency phone call. Additionally/alternatively, if the prerecorded message contains data and/or text, the telephony device may send the data and/or text to an emergency service center as a data or text message, or through the connected emergency phone call.

Receiving 306 the location of a telephony device (e.g. telephony device 16, 18) may include sending 312 a command to the telephony device requesting the location of the telephony device. Once the command is sent 312, security process 10 may receive 314 a response from the telephony device that includes the telephony devices location, or includes information that may be used to identify the telephony device's location. Security process 10 may then determine 316 the location of the telephony device based on the received 314 response. The command may be a request for the telephone number of the telephony device, a request for the identification of a telephone service that is providing cellular or data service to the telephony device, and/or a global positional system (GPS) location of the telephony device, for example. Similarly, the received 314 response may include the telephone number of the telephony device, an identification of the telephone service that is providing cellular or data service to the telephony device, and or a GPS location of the telephony device, for example.

Figure 5:
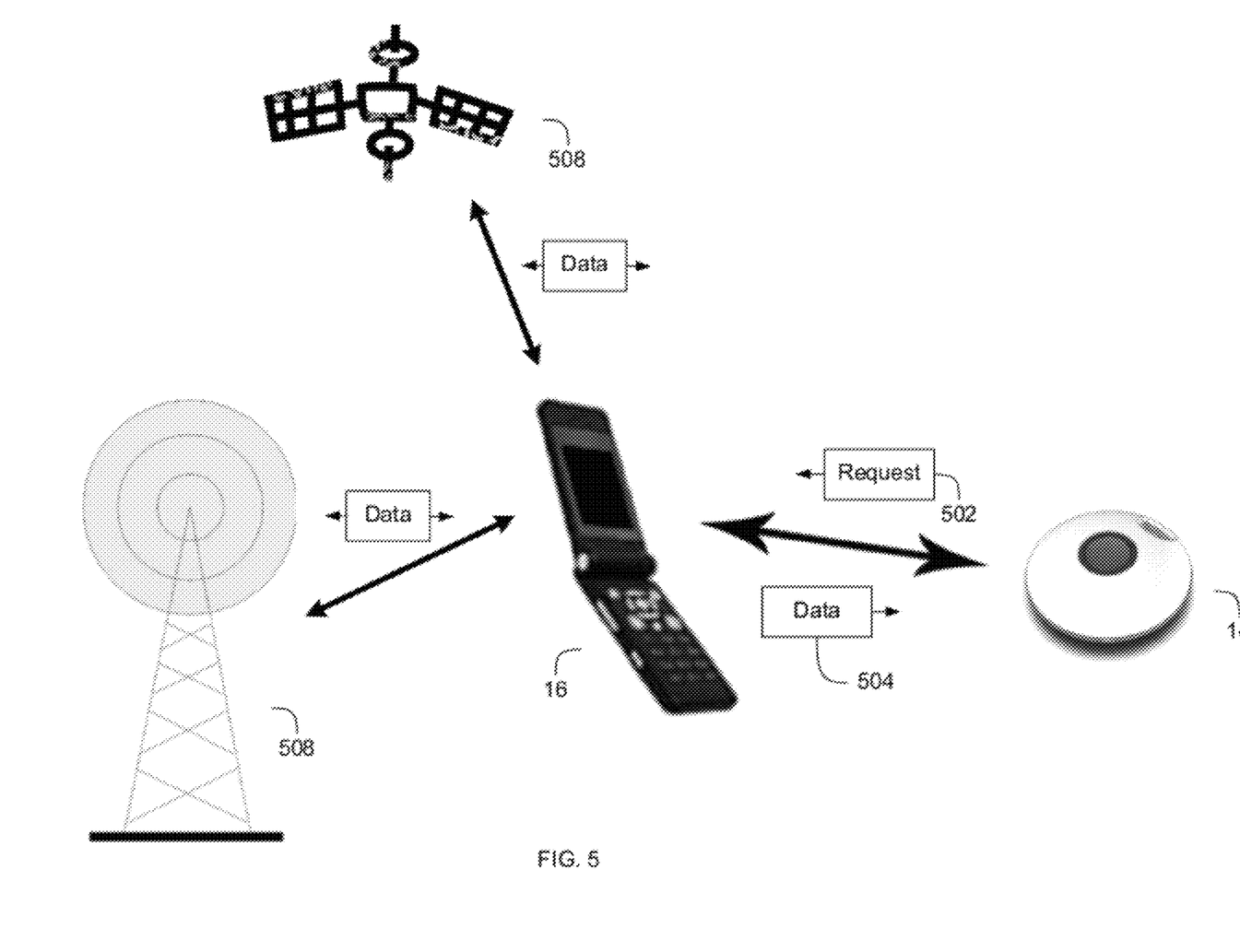
FIG. 5 is diagrammatic view of a wireless security device paired to a telephony device.

FIG. 5 is a diagram depicting receiving 306 the location of a telephony device. Wireless security device 14 may send 312 request 502 to telephony device 16. If request 502 includes a request for telephony device 16's telephone number, telephony device 16 may send data 504 back to wireless security device 14. In this case, data 504 may include telephony device 16's phone number. If request 502 includes a request for the identification of a network providing service to telephony device 16, then telephony device may contact telephony device's service provider to acquire the identification. Telephony device 16 may then send data 504, which may include the identification of the network, to wireless security device 14. A request 502 for the identification of the network may include the AT+COPS command, an AT modem command that can identify all available networks, for example. For example, wireless security device 14 may send 312 an AT command, such as the AT+COPS command, to telephony device 16. Telephony device 16 may then respond to wireless security device by sending data 504, which may include the telephony device 16's network information, the telephony device 16's location, or information relating to telephony device 16's location, as discussed above.

Telephony device may also include a GPS receiver (not shown). If request 502 includes a request for a GPS location of telephony device 16, telephony device may communicate with GPS satellite to determine a GPS location. Once telephony device 16 determines a GPS location, telephony device may send data 504, which may include the GPS location, to wireless security device 14. A request 502 for the GPS location of the telephony device may include the AT+CMOLRG command, an AT modem command that requests a GPS location of the telephony device, for example. For example, wireless security device 14 may send 312 an AT command, such as the AT+CMOLRG command, to telephony device 16. Telephony device 16 may then respond to wireless security device by sending data 504, which may include telephony device 16's GPS location.

Security process 10 may identify 308 an emergency phone number based, at least in part, upon the received 306 location of a telephony device (e.g. telephony device 16, 18). For example, if the received location indicates that telephony device is in the United States, security process 10 may identify the emergency phone number "911" as an appropriate emergency phone number to call, or may identify an appropriate national emergency service "800" number.

Security process 10 may identify 308 the emergency phone number based on the location information received 306 from telephony device 16. If the location information includes the telephony device's telephone number, security process 10 may use the telephone number to identify the telephony device's location and an appropriate telephone number. For example, if the location information contains the telephone number "617-555-5555," security process 10 may recognize that telephone extension "617" is associated with a geographical location in eastern Massachusetts. Accordingly, security process 10 may identify 308 the emergency phone number "911" (the emergency phone number for the United States) as the appropriate emergency phone number to call, or may identify an appropriate national emergency service "800" number. Similarly, if the location information includes a telephone number with a country code, security process 10 may use the country code to identify 308 the emergency phone number. For example, if the telephone number includes the country code "44" (the country code for Great Britain), security process 10 may identify emergency phone number "112" (the emergency phone number for Great Britain and/or Europe) as the appropriate emergency phone number.

If the location information includes and identifier of the telephony device's network provider, security process 10 may use the identifier to identify the telephony device's location and an appropriate telephone number. For example, if the network provider is located in Japan, security process 10 may identify 308 the emergency telephone number "110" (the emergency police number in Japan) as the appropriate emergency telephone number.

If the location information contains GPS coordinates, security process 10 may use the GPS coordinates to identify 308 an appropriate telephone number. For example, if the GPS coordinates are 13° 06' north latitude and 59° 37' west longitude (i.e. GPS coordinates that fall within the boundaries of Bridgetown, Barbados), then security process 10 may identify 308 the emergency telephone number "211" (the emergency police number in Barbados), as the appropriate emergency telephone number.

Figure 6:
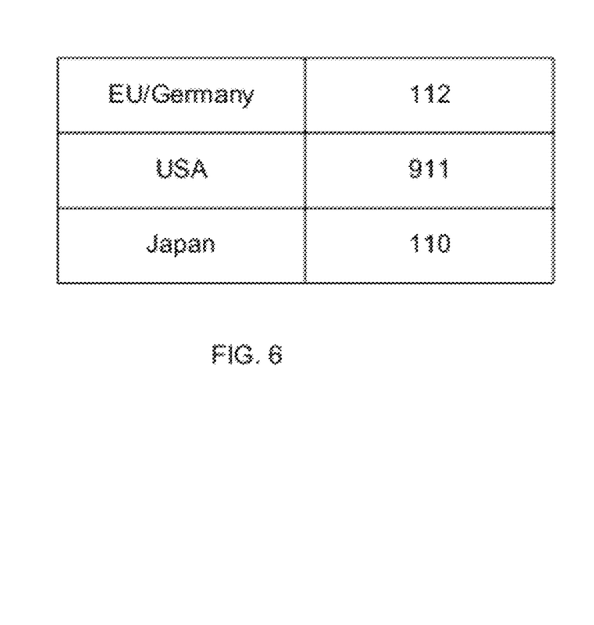
FIG. 6 is a data layout view of a lookup table containing geographic locations and emergency numbers.

Security process 10 may identify 308 the emergency phone number by accessing 320 a lookup table that associates location information with emergency phone numbers. Security process 10 may use the lookup table to correlate the received 306 location with an appropriate emergency telephone number. FIG. 6 includes lookup table 600, which is an example of a lookup table that may be used to identify 308 an emergency phone number. Lookup table 600 may be a data table or data structure stored, for example, in memory 204. As shown in FIG. 6, lookup table 600 may have two columns: a left column contains countries, and a right column contains emergency telephone numbers associated with the countries in the left column. Of course, lookup table 600 may have additional columns with additional information.

Once security process 10 receives 306 the location of the telephony device, security process 10 can correlate 320 the location to the appropriate emergency phone number in lookup table 600. For example, if security process 10 determines 316 that telephony device is in the United States, security process 10 can find the entry "USA" within lookup table 600 and determine that emergency phone number "911" is the appropriate emergency phone number for the location, or may identify an appropriate national emergency service "800" number. Although this example shows lookup table 600 having entries based on countries, one of ordinary skill in the art will recognize that other type of data may be used to locate entries in lookup table 600. For example, instead of, or in addition to, having entries based on particular countries, lookup table 600 may include entries based on countries, states, country codes, area codes, GPS locations, ranges of latitude and longitude, and/or any other type of entry associated with a geographic location. Lookup table 600 may include emergency telephone numbers for any type of geographic location identifier. Although not shown, lookup table 600 may also have entries based on latitudinal and longitudinal ranges. For example, an entry in lookup table 600 may be a range of latitudinal and longitudinal coordinates that define the boundaries of Barbados. Lookup table 600 may associate the ranges that define Barbados with emergency phone number 211—the emergency number for Barbados. Thus, if the location information received from telephony device 16 includes GPS coordinates that fall within the range for Barbados, security process 10 may identify 308 the appropriate emergency phone number for Barbados by finding the entry that contains the appropriate range of latitudinal and longitudinal coordinates in lookup table 600.

Lookup table 600 may be a table and/or data structure stored in memory 204, for example. Lookup table 600 may be an array, a database, a hashtable, a class, a data structure, an XML file, and/or any other type of table or data structure that may associate geographic locations with emergency telephone numbers, for example.

Once security process 10 identifies 308 the emergency phone number, security process 10 may send 310 a command to the telephony device (e.g. telephony device 16, 18) to place an emergency telephone call to the identified 308 emergency phone number. The command may be a Bluetooth™ command, and/or AT and/or modem command that instructs the telephony device to place a call to the emergency telephone number.

When the telephony device places the emergency telephone number, security process 10 may send 312 a prerecorded message to the telephony device and instruct the telephony device to deliver the prerecorded message to the emergency service or other party on the other end of the emergency telephone call. The prerecorded message may include important information about the emergency, such as the name and address of the owner of wireless security device 14, for example. The prerecorded message may include other information, such as the received 306 location of the telephony device. Thus, by providing the prerecorded message and or the received location information, security process 10 may facilitate the emergency service in quickly and efficiently sending the appropriate help to locate the device, especially if the owner of wireless security device 14 is unable speak or otherwise provide information to the emergency service his/herself.

The prerecorded message may be an audio message and/or a data message. If the prerecorded message is an audio message, security process 10 may use the hands-free and/or headset Bluetooth™ profile to play the audio message through the telephony device, so a listener (e.g. an emergency technician) on the other end of the telephone call can hear the prerecorded message. If the prerecorded message is a data message, security process 10 may send the message as a text message or other type of data message so a listener (e.g. an emergency technician) on the other end of the telephone call can view the data in the prerecorded message. For example, security process 10 may send one or more AT commands to telephony device 16 that cause telephony device 16 to send an SMS text message to the listener. The AT commands may be sent through one or more of the Bluetooth™ wireless profile interfaces, and may include AT commands such as AT+CMGF, which may set a modem into text mode in order to send an SMS text message. The text message may include emergency information that allows the listener/receiver of the text message to ascertain the identity of a user, the location of a user, the nature of the emergency, and other information important to identify the emergency and send the appropriate help. Also, telephony device 16 may execute an application (not shown) that facilitates creation of the text message.

Security process 10 may also provide 322 speakerphone services. For example, if the telephony device places a telephone call, security process 10 may use the hands-free and/or headset Bluetooth™ protocol profile to send audio/voice to and/or receive audio/voice data from the telephony device. Wireless security device 14 may use speaker 210 to play the audio/voice data from the telephone call, and/or may use microphone 212 to capture audio/voice data for the telephone call. Security process 10 may provide 322 speakerphone services for normal telephone calls placed or received by the telephony device, and/or for the emergency telephone call described above.

Figure 7:
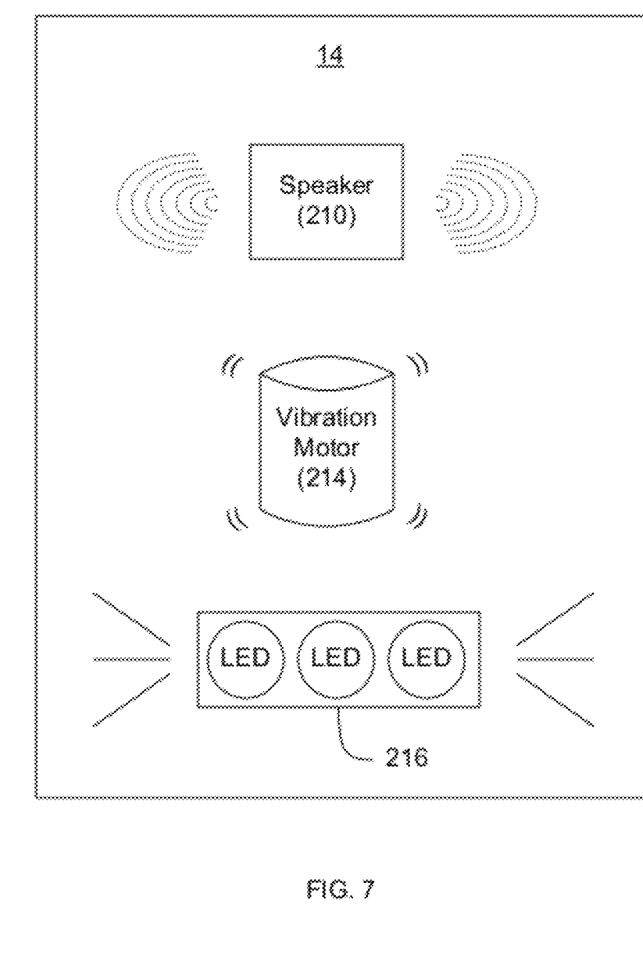
FIG. 7 is an architectural block diagram of notification components of a wireless security device.

Security process 10 may also generate different kinds of notifications for various scenarios. As shown in FIG. 7, security process 10 may generate a notification by playing a sound through speaker 210 (e.g. a beep or an audio media file), activating vibration motor 214, and/or illuminate one or more indicators in LED bank 216. One skilled in the art will recognize that wireless security device 14 may include any manner of electronic visual indicator, including, but not limited to: LEDs, LCD displays, or other visual indicators. The sound, tactile feedback, and visual feedback generated by wireless security device 14 may alert a user that an event has occurred. Wireless security device 14 may generate a notification through any combination of activation and deactivation of speaker 210, vibration motor 214, and/or LED bank 216. Security process 10 may generate different notifications for various different scenarios.

For example, if a telephony device wirelessly connected to wireless security device 14 receives a telephone call, wireless security device 14 may receive notification of the telephone call through features of the hands-free and/or headset Bluetooth™ protocol profiles, for example. Wireless security device 14 may then generate 324 a telephone call notification to alert a user that there is an incoming call.

If any device wirelessly connected to wireless security device goes beyond a certain range, wireless security device may generate 326 an out-of-range notification so that a user can keep track of his/her wirelessly connected devices. For example, if telephony device 16 and wireless security device 14 become separated physically, wireless security device 14 may generate an out-of-range notification to alert a user that telephony device 16 is no longer nearby. Security process 10 may determine that telephony device 16 is out of range by monitoring a quality parameter of the wireless connection between wireless security device 14 and telephony device 14 (or any other wirelessly connected device). If the quality parameter falls below a predetermined threshold, security process 10 may generate a notification.

For example, as wireless security device 14 and telephony device 16 become separated, the quality of the wireless connection between wireless security device 14 and telephony device 16 may degrade. Security process 10 may monitor and measure the quality of the wireless connection. Security process 10 may periodically measure and/or monitor a received signal strength indication (RSSI) of the wireless connection, or may measure and/or monitor a number of digital data errors received over the wireless connection. As wireless security device 14 and telephony device 16 become separated, the value of the RSSI measurement may decrease and/or the number of digital data errors may increase. If the RSSI falls below a predetermined minimum threshold, it may indicate that telephony device 16 is distant from wireless security device 14. Similarly, if the digital data error measurement falls above a predetermined maximum, it may indicate that telephony device 16 is distant from wireless security device 14. Accordingly, wireless security device may generate 324 an out of range notification.

A user may use the out of range notification as a warning that the wirelessly connected device has been left behind or stolen. For example, a user may attach wireless security device 14 to his/her keychain. If a user walks away from telephony device 16 after leaving telephony device 14 in a taxi-cab, for example, wireless security device 14, attached to the user's keychain, may generate a notification warning the user that he/she has left telephony device 16 behind.

Security process 10 may escalate the out-of-range notification as telephony device 16 moves further away from wireless security device 14. Security process 10 may include, for example, multiple wireless connection quality thresholds. As telephony device 16 moves away from wireless security device 14, the measurement of the quality of the wireless connection may continue to degrade. As the measurement degrades further, it may pass a second threshold. When the measurement passes the second threshold, security process 10 may escalate the notification by, for example, playing a sound through speaker 210, activating vibration motor 214, and/or illuminating LED bank 216. Security process 10 may escalate the notification in various ways, such as raising the volume of speaker 210, changing a pattern of beeps played by speaker 210, providing more power to vibration motor 216, and flashing the LEDs of LED bank 216, for example. Of course, security process 10 may include multiple quality thresholds and multiple escalations of the notification.

A user may cancel the out-of-range notification by pressing button 218. Additionally/alternatively, if telephony device 16 and wireless security device 14 come back into range of each other, or if they re-connect by re-establishing a Bluetooth™ connection with each other, security process 10 may cancel the out-of range notification. Additionally/alternatively, security process 10 may de-escalate an out-of-range notification as wireless security device 14 and telephony device 16 come into closer range of each other. For example, security process 10 may measure the quality of the wireless connection between security device 14 and telephony device 16 and, as the measurement of the quality improves, security process 10 may de-escalate an out-of-range notification.

Security process 10 may generate 326 a unique out of range notification for each device wirelessly connected to wireless security device 14. For example, FIG. 1 shows wireless security device coupled to at least telephony devices 16, 18, and media player 20. If telephony device 16 begins to go out of range, security process 10 may generate 326 a particular out of range notification that may consist of a particular series of sounds, vibrations, and/or flashing of indicators. However, if media player 20 or telephony device 18 begin to go out of range, security process 10 may generate 326 a different out of range notification that may consist of a different series of sounds, vibrations, and/or flashing indicators. Security process 10 may generate 326 a different and unique out of range notification for each device wirelessly connected to wireless security device 14.

Security process 10 may generate 328 an out of range notification by sending a command to a wirelessly connected device. For example, if telephony device 16 begins to go out of range, security process 10 may send a command to telephony device 16 that causes telephony device 16 to beep, or make some other noise or alert to notify a user that telephony device 16 and wireless security device 14 are far apart. In one embodiment, telephony device 16 may include a preexisting command which, when received, will cause telephony device 16 to beep or make a noise. In this case, wireless security device 14 may send the preexisting command to telephony device. In another embodiment, telephony device 16 may execute a custom software application (not shown) that provides a custom interface. The custom software application and/or custom interface may accept the command from wireless security device 14 and may cause telephony device 16 to generate 328 the out of range notification.

Security process 10 may also generate 328 a disconnect notification if someone tries to disconnect the wireless connection through a user interface of a wirelessly connected device. For example, many cellular telephones have user interfaces that allow a user to disconnect a paired Bluetooth™ device. If telephony device 16 is paired to wireless security device 16, and someone accesses a user interface of telephony device 16, he/she may be able disconnect wireless security device 14 from telephony device 16 by removing the pairing. If someone attempts to or succeeds in removing the pairing between wireless security device 14 from telephony device 16, wireless security device 14 may generate 328 a disconnect notification.

If telephony device 16 and wireless security device 14 become disconnected, and then become reconnected, the security process 10 may also cancel the notification to the user. In this way, wireless security device 14 may inform the user that telephony device 16 and/or wireless security device 14 have become reconnected and/or have reentered the user's proximity. Upon reconnecting to the telephony device 16, the security device 14 may also send a command to telephony device 16 to cancel a disconnect or out-of-range notification on telephony device 16.

Security process 10 may also cause 330 a telephony device to answer an incoming call, or cause 332 a telephony device to cancel or ignore an incoming call. If telephony device receives an incoming call, wireless security device 14 may generate 324 a telephone call notification, as described above. A user of wireless security device may then activate button 218, by pushing button 218, for example. Activating button 218 may cause wireless access device 14 to send a command to the telephony device, instructing the telephony device to answer the call. If the user activates button 218 in a different way, by double-pushing button 218, for example, wireless security device may send a command to the telephony device, instructing the telephony device to cancel or ignore the call, for example.

Security process 10 may also generate 334 a panic alarm in response to activation of button 218. If a user presses and holds button 218, for example, security process 10 may cause wireless security device 14 to generate 334 a panic alarm. The panic alarm may be a loud, audible alarm, whistle, beep, and/or warning played through speaker 210. The warning may be an audio file (such as an MP3) that loudly recites the words "Warning, Emergency," or provides some other message indicating an emergency. The panic alarm may be loud enough to alert passers-by that someone may be in trouble. The panic alarm may also be loud enough to warn or scare a perpetrator who may be thinking of causing harm. Security process 10 may cancel 336 the panic alarm in response to a user activating the button, for example, or in response to other input, such as a command from the telephony device, etc.

Button 218 may provide a primary user interface to wireless security device 14. Button 218 may be a multi-function button that provides various features and functions depending upon how a user pushes button 218. For example, if a user presses and holds button 218, wireless security device 16 may initiate an emergency telephone call, as described above. If the user continues to hold button 218 for a longer time, for example, wireless security device may generate 334 a panic alarm, as described above. If a user single-presses or double-presses button 218, wireless security device may cause a telephony device to answer or cancel a call, as described above. One skilled in the art will recognize that different patterns of activation, and durations of activation, of button 218 may cause wireless security device 16 and/or security process 10 to perform various functions, or may vary the order by which the functions are performed.

Figure 8:
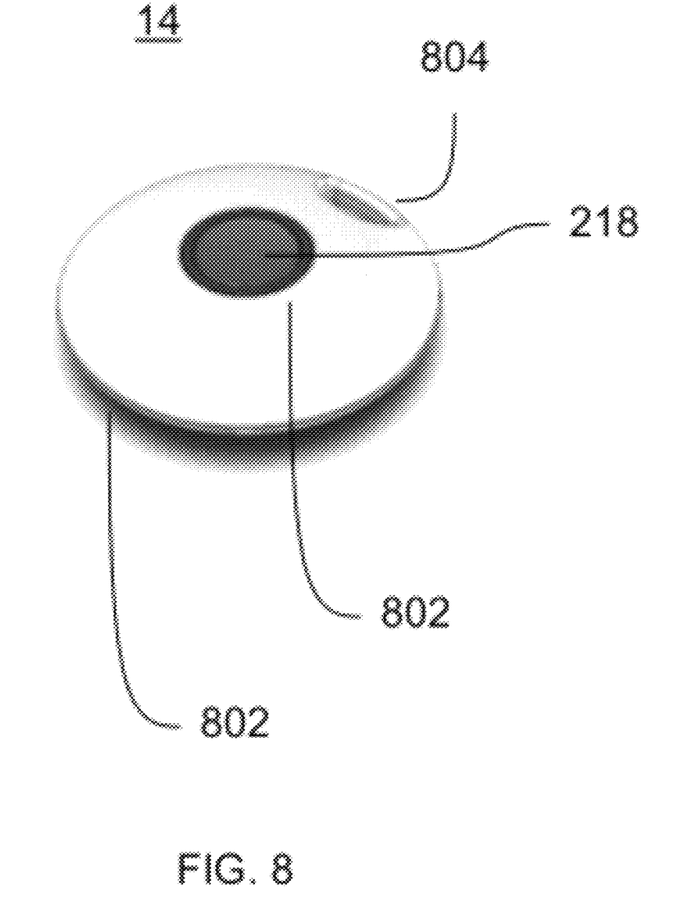
FIG. 8 is an external view of a wireless security device.

FIG. 8 shows an exterior view of an embodiment of wireless security device 14. In the embodiment shown in FIG. 8, wireless security device may include light rings 802, which may be a light ring or light pipe that illuminates when one or more LEDs are activated. Wireless security device 14 may also include a display (e.g. an LCD display) or other mechanism which may illuminate or provide visual feedback. Wireless security device may also include keyring attachment 804, which may be a cut out portion of the outer casing of wireless security device 14. Keyring attachment 804 may allow a user to attach wireless security device 14 to a keyring, purse, article of clothing, or other article.

A number of implementations have been described. Nevertheless, it will be understood that various modifications may be made. Accordingly, other implementations and other uses are within the scope of the following claims.

The invention claimed is:

1. A wireless security device comprising:
 a processor;
 a wireless transceiver;
 a memory; and
 computer program instructions stored in the memory, which, when executed by the processor, cause the wireless security device to perform operations comprising:
  selecting and implementing a Bluetooth wireless protocol profile from one or more Bluetooth wireless protocol profiles for connecting to one or more Bluetooth enabled devices;
  wirelessly pairing, via the wireless transceiver over a personal area network, with a Bluetooth enabled telephony device using the selected Bluetooth wireless protocol profile, thus creating a wirelessly paired Bluetooth connection between the wireless security device and the telephony device;
  sending a command to the telephony device requesting one or more of:
   a telephone number of the telephony device;
   a telephone network providing service to the telephony device; and a global positioning system (GPS) location of the telephony device;

receiving a response from the telephony device including one or more of:
the telephone number of the telephony device;
the telephone network providing service to the telephony device; and
the GPS location of the telephony device; and determining a current location of the telephony device based on one or more of the telephone number, the telephone network, and the GPS location;

accessing a lookup table stored in the memory including one or more location codes and one or more emergency telephone numbers associated with the one or more location codes;

correlating the location with at least one of the one or more location codes to obtain at least one of the one or more emergency telephone numbers;

sending a command, over the wirelessly paired Bluetooth connection, to the telephony device to place a telephone call to the at least one of the one or more emergency telephone numbers; and once the telephone call is placed, sending a prerecorded emergency message to the telephony device over the wirelessly paired Bluetooth connection, causing the telephony device to transmit the prerecorded emergency message.

2. The wireless security device of claim 1 wherein the one or more Bluetooth wireless protocol profiles include one or more of:
a Bluetooth hands-free profile;
a Bluetooth headset profile; and
a Bluetooth advanced audio distribution profile.

3. The wireless security device of claim 1 wherein the operations further comprise:
receiving, over the wirelessly paired Bluetooth connection, a location of the Bluetooth enabled telephony device; and
identifying the emergency telephone number based on the location.

4. The wireless security device of claim 1 wherein the wireless security device further comprises:
a speaker; and
a microphone.

5. The wireless security device of claim 4 wherein the operations further comprise providing speakerphone services including:
sending audio data captured by the microphone to the telephony device via the wireless transceiver; and
once the telephone call is placed, audibly playing, by the speaker, audio data received from the telephony device via the wireless transceiver.

6. The wireless security device of claim 4 further comprising:
generating a panic alarm including generating an audible sound through the speaker.

7. The wireless security device of claim 4 further comprising:
a light emitting diode; and
a vibration motor.

8. The wireless security device of claim 7 wherein the operations further comprise:
generating a notification when an incoming telephone call is received by the telephony device, the notification comprising one or more of:
illuminating the light emitting diode;
activating the vibration motor; and
generating an audible sound through the speaker.

9. The wireless security device of claim 7 wherein the operations further comprise:
generating an out-of-range notification when a measurement of a quality parameter of the Bluetooth wireless connection indicates the quality parameter of the Bluetooth wireless connection is outside a predetermined quality threshold, the notification comprising one or more of:
illuminating the light emitting diode;
activating the vibration motor; and
generating an audible sound through the speaker.

10. The wireless security device of claim 9 wherein generating the out-of-range notification comprises:
if more than one Bluetooth enabled devices are paired with the wireless security device, generating a unique out-of-range notification for each Bluetooth enabled device.

11. The wireless security device of claim 7 wherein the operations further comprise:
generating a notification when at least one of the one or more Bluetooth wireless protocol profiles is disconnected by a paired Bluetooth device, the notification including one or more of:
illuminating the light emitting diode;
activating the vibration motor; and
generating an audible sound through the speaker.

12. The wireless security device of claim 1 further comprising a button.

13. The wireless security device of claim 12 wherein the operations further comprise:
in response to an activation of the button, answering, by the telephony device, an incoming telephone call received by the telephony device; and
in response to an activation of the button, canceling, by the telephone device, an incoming telephone call received by the telephony device.

14. The wireless security device of claim 12 wherein the operations further comprise canceling a panic alarm in response to activation of the button.

15. The wireless security device of claim 12 wherein the operations further comprise canceling an out-of-range alarm in response to one of:
activation of the button; and
the Bluetooth wireless connection becoming reconnected.

16. The wireless security device of claim 1 wherein the processor and the wireless transceiver implement Bluetooth low energy technology.

17. A method comprising:
selecting and implementing, by a wireless security device, a Bluetooth wireless protocol profile from one or more Bluetooth wireless protocol profiles for connecting to one or more Bluetooth enabled devices;
wirelessly pairing, via a wireless transceiver of the wireless security device over a personal area network, with a Bluetooth enabled telephony device using the selected Bluetooth wireless protocol profile, thus creating a wirelessly paired Bluetooth connection between the wireless security device and the telephony device;
sending a command to the telephony device requesting one or more of:
a telephone number of the telephony device;
a telephone network providing service to the telephony device; and
a global positioning system (GPS) location of the telephony device;

receiving a response from the telephony device including one or more of:
- the telephone number of the telephony device;
- the telephone network providing service to the telephony device; and
- the GPS location of the telephony device; and determining a current location of the telephony device based on one or more of the telephone number, the telephone network, and the GPS location;

accessing a lookup table stored in the memory including one or more location codes and one or more emergency telephone numbers associated with the one or more location codes;

correlating the location with at least one of the one or more location codes to obtain at least one of the one or more emergency telephone numbers;

sending a command, by the wireless security device, over the wirelessly paired Bluetooth connection, to the telephony device to place a telephone call to the at least one of the one or more emergency telephone numbers; and once the telephone call is placed, sending a prerecorded emergency message from the wireless security device to the telephony device over the wirelessly paired Bluetooth connection, causing the telephony device to transmit the prerecorded emergency message.

18. The method of claim 17 wherein the one or more Bluetooth wireless protocol profiles include one or more of:
- a Bluetooth hands-free profile;
- a Bluetooth headset profile; and
- a Bluetooth advanced audio distribution profile.

19. The method of claim 17 further comprising:
receiving, over the wirelessly paired Bluetooth connection, a location of the Bluetooth enabled telephony device; and
identifying the emergency telephone number based on the location.

20. The method of claim 17 further comprising:
sending audio data captured by a microphone of the wireless security device to the telephony device via the wireless transceiver; and
once the telephone call is placed, audibly playing, by a speaker of the wireless security device, audio data received from the telephony device via the wireless transceiver.

21. The method of claim 17 further comprising:
generating, by the wireless security device, a notification when an incoming telephone call is received by the telephony device, the notification comprising one or more of:
- illuminating at least one light emitting diode of the wireless security device;
- activating a vibration motor of the wireless security device; and
- generating an audible sound through a speaker of the wireless security device.

22. The method of claim 17 further comprising:
generating, by the wireless security device, an out-of-range notification when a measurement of a quality parameter of the Bluetooth wireless connection indicates the quality parameter of the Bluetooth wireless connection is outside a predetermined quality threshold, the notification comprising one or more of:
- illuminating at least one light emitting diode of the wireless security device;
- activating a vibration motor of the wireless security device; and
- generating an audible sound through a speaker of the wireless security device.

23. The method of claim 22 wherein generating the out-of-range notification comprises:
if more than one Bluetooth enabled devices are paired with the wireless security device, generating a unique out-of-range notification for each Bluetooth enabled device.

24. The method of claim 17 further comprising:
executing, by the telephony device, software instructions configured to generate an out-of-range notification; and
generating, by the telephony device, an out-of-range notification when a measurement of a quality parameter of the Bluetooth wireless connection indicates the quality parameter of the Bluetooth wireless connection is outside a predetermined quality threshold, the notification comprising generating an audible sound through a speaker of the telephony device.

25. The method claim 17 further comprising:
generating a notification when at least one of the one or more Bluetooth wireless protocol profiles is disconnected by a paired Bluetooth device, the notification including one or more of:
- illuminating at least one light emitting diode of the wireless security device;
- activating a vibration motor of the wireless security device; and
- generating an audible sound through a speaker of the wireless security device.

26. The method of claim 17 further comprising:
in response to an activation of a button of the wireless security device, answering, by the telephony device, an incoming telephone call received by the telephony device; and
in response to an activation of the button of the wireless security device, canceling, by the telephone device, an incoming telephone call received by the telephony device.

27. The method of claim 17 further comprising canceling a panic alarm in response to activation of a button of the wireless security device.

28. The method of claim 17 further comprising canceling an out-of-range alarm in response to one of:
- activation of a button of the wireless security device; and
- the Bluetooth wireless connection becoming reconnected.

* * * * *